(12) United States Patent
Oehler et al.

(10) Patent No.: US 11,881,975 B2
(45) Date of Patent: Jan. 23, 2024

(54) POWER-SAVING SAMPLING RECEIVER WITH NON-COHERENT SAMPLING WITH ONE SAMPLE PER BIT

(71) Applicant: Fraunhofer-Gesellschaft zur Förderung der angewandten Forschung e.V., Munich (DE)

(72) Inventors: Frank Oehler, Erlangen (DE);
Heinrich Milosiu, Erlangen (DE);
Norbert Weber, Erlangen (DE);
Michael Geyer, Erlangen (DE); Dieter Frühsorger, Erlangen (DE); Gralf Popken, Erlangen (DE); Thomas Thönes, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/705,976

(22) Filed: Mar. 28, 2022

(65) Prior Publication Data
US 2022/0311650 A1 Sep. 29, 2022

(30) Foreign Application Priority Data
Mar. 29, 2021 (DE) .................. 10 2021 203 147.1

(51) Int. Cl.
*H04L 27/22* (2006.01)
*H04L 27/227* (2006.01)
(Continued)

(52) U.S. Cl.
CPC ........ *H04L 27/2278* (2013.01); *H04L 1/0068* (2013.01); *H04L 27/02* (2013.01); *H04W 52/0229* (2013.01)

(58) Field of Classification Search
CPC ... H04L 27/02; H04L 27/2278; H04L 1/0068; H04L 7/042; H04W 52/0229
See application file for complete search history.

(56) References Cited

U.S. PATENT DOCUMENTS 5,063,571 A 11/1991 Vancraeynest
5,210,770 A * 5/1993 Rice ................... H04J 13/00
375/142

(Continued)

FOREIGN PATENT DOCUMENTS

DE 10 2012 221 121 A1 6/2014
EP 1 322 061 A2 6/2003
(Continued)

OTHER PUBLICATIONS

Bohorquez, J.L., et al.; "A 350uW CMOS MSK Transmitter and 400uW OOK Super-Regenerative Receiver for Medical Implant Communications;" IEEE Journal of Solid-State Circuits (VLSI Symposium Special Issue); Apr. 2009; pp. 1248-1259.

(Continued)

*Primary Examiner* — Siu M Lee
(74) *Attorney, Agent, or Firm* — McClure, Qualey & Rodack, LLP (57) ABSTRACT

Embodiments provide a data receiver, the data receiver being configured to receive a signal including a sequence of N bits so as to obtain a reception signal, wherein N is a natural number greater than or equal to eight, $N \geq 8$, wherein the data receiver is configured to sample the reception signal with a sampling rate that corresponds, with an intentional deviation of up to 2/N, to one sample value per bit of the sequence of N bits so as to obtain a sequence of received bits, wherein the data receiver is configured to correlate the sequence of received bits with K different sequences of N-1 reference bits so as to obtain K partial correlation results, (Continued)

wherein K is smaller than or equal to N-1 and greater than or equal to three, N-1≥K≥3.

10 Claims, 9 Drawing Sheets

(51) Int. Cl.
*H04L 1/00* (2006.01)
*H04L 27/02* (2006.01)
*H04W 52/02* (2009.01)

(56) References Cited

U.S. PATENT DOCUMENTS

| | | | |
|---|---|---|---|
| 5,784,403 A | 7/1998 | Scott | |
| 8,599,824 B2 * | 12/2013 | Walley | H04L 7/042 375/354 |
| 2007/0211835 A1 | 9/2007 | Inagawa et al. | |
| 2008/0108318 A1 | 5/2008 | Min et al. | |
| 2013/0208831 A1 | 8/2013 | Oehler et al. | |
| 2014/0140434 A1 | 5/2014 | Seeger | |
| 2021/0021373 A1 * | 1/2021 | Hassan | H04J 13/0029 |

FOREIGN PATENT DOCUMENTS

| | | |
|---|---|---|
| EP | 2 591 557 B1 | 12/2018 |
| WO | 00/41355 A1 | 7/2000 |
| WO | 2013/131963 A1 | 9/2013 |

OTHER PUBLICATIONS

Piyare, R., et al.; "Ultra Low Power Wake-Up Radios: A Hardware and Networking Survey;" IEEE Communications Surveys & Tutorials; vol. 19; No. 4; Jun. 2017; pp. 2117-2157.

Milosiu, H.; "Integrierter UHF-Funkempfänger mit niedrigem Stromverbrauch und geringer Antwortzeit für die störsichere Übertragung;" Kapitel 3.9.4, Dissertation FAU Erlangen; 2012; pp. 83-84.

European Search Report dated Oct. 18, 2022, issued in application No. EP 22164639.1.

Huang, X., et al.; "A 2.4GHz/915MHz 51 µW Wake-Up Receiver with Offset and Noise Suppression;" 2010 IEEE International SolidState Circuits Conference Digest of Technical Papers; 2010); pp. 222-223.

Drago, S., et al.; "A 2.4GHz 830pJ/bit Duty-Cycled Wake-Up Receiver with −82dBm Sensitivity for CrystalLess Wireless Sensor Nodes;" 2010 IEEE International SolidState Circuits Conference Digest of Technical Papers; 2010; pp. 224-225.

Alpman, E., et al.; "95 µW 802. 11g/n compliant fully-integrated wake-up receiver with −72dBm sensitivity in 14nm FinFET CMOS;" 2017 IEEE Radio Frequency Integrated Circuits Symposium (RFIC); 2017; pp. 172-175.

Armas, E.T., et al.; "A 40.9 µW high sensitivity wake-up radio for wireless sensor networks using uncertain-IF architecture;" 2015 Conference on Design of Circuits and Integrated Systems (DCIS); 2015; pp. 1-6.

* cited by examiner

| code length | AKF distance | tolerable inversion bit errors |
|---|---|---|
| 8 | 3 | 1 |
| 10 | 3 | 1 |
| 12 | 5 | 2 |
| 14 | 7 | 3 |
| 18 | 7 | 3 |
| 20 | 8 | 3 |
| 22 | 10 | 4 |
| 23 | 10 | 4 |
| 25 | 11 | 5 |
| 26 | 11 | 5 |
| 27 | 12 | 5 |
| 28 | 12 | 5 |
| 30 | 13 | 6 |
| 31 | 14 | 6 |

Fig. 4

TX data: 1101 0110 1100 1101 0

RX data: 1101 0110 1101 1010 (The transmitted 0-bit is missing)

Fig. 5

TX data: 1011 0110 1100 1101 0

RX data: 1101 1011 0110 0110 10 (The transmitted 1-bit was read twice)

Fig. 10 Con't

US 11,881,975 B2

POWER-SAVING SAMPLING RECEIVER WITH NON-COHERENT SAMPLING WITH ONE SAMPLE PER BIT

CROSS-REFERENCE TO RELATED APPLICATION

This application claims priority from German Patent Application No. DE 10 2021 203 147.1, which was filed on Mar. 29, 2021, and is incorporated herein in its entirety by reference.

BACKGROUND OF THE INVENTION

Embodiments of the present invention relate to a data receiver, and in particular to a power-saving sampling receiver with non-coherent sampling with one sample per bit.

Power-saving receivers that are often configured as detector-receivers or super-regenerative receivers are known. The current consumption amounts to some 100 µA.

[1] presents a diode detector with an upstream LNA (Low Noise Amplifier). The current consumption amounts to 100 µA.

[2] describes a super-regenerative receiver with a relative high current consumption of 570 µA.

[3] presents a sampling PLL-based receiver ("duty cycle PLL") that is synchronized to the transmitter. With 346 µA, the current consumption is also relatively high.

[4] describes a sampling receiver with a constant sampling rate and a constant on-time. The receiver is composed of an analog part and a digital part. Radio frequency sampling (RF sampling) is performed by switching on/off the entire receiver. Here, the analog part and the digital part are switched on in the "on-phases" and switched off in the "off-phases".

Figure 1:
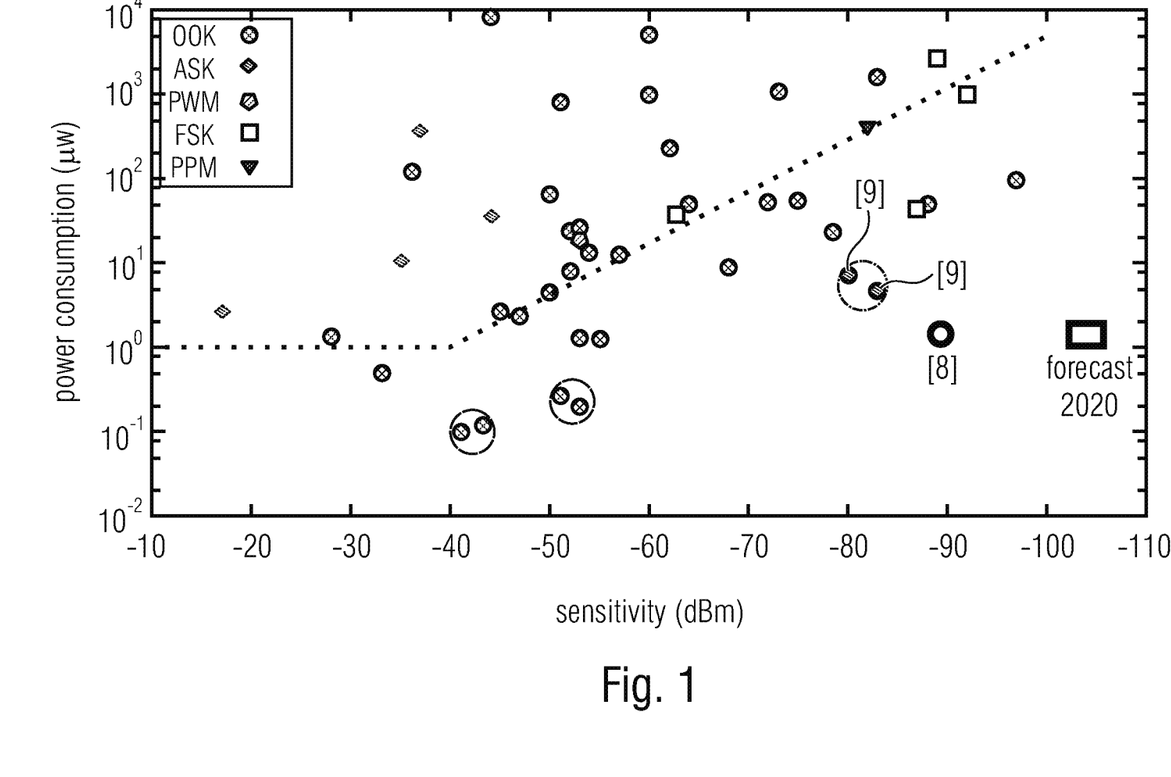
FIG. 1 shows, in a diagram, power consumptions in µW vs. sensitivities in dBm of conventional ultra-low-power receivers for the UHF frequency range for different modulation methods (OOK, ASK, PWM, FSK, PPM)

In a diagram, FIG. 1 shows power consumptions in µW vs. sensitivities in dBm of conventional ultra-low-power receivers for the UHF frequency range for different modulation methods (OOK (On-Off Keying), ASK (Amplitude Shift Keying), PWM (Pulse Width Modulation), FSK (Frequency Shift Keying), PPM (Pulse Pause Modulation)).

In other words, FIG. 1 shows in a diagram an overview of disclosed ultra-low-power receivers in a diagram of power vs. sensitivity.

The diagram shown in FIG. 1 is borrowed from [5] and is slightly modified using the wake-up receiver contributions of [8] and [9]. The saving by direct sampling ("OVS1"), instead of oversampling with a certain factor, approximately corresponds to a decadic scale division (vertical axis).

[6] presents a 95-µW receiver for the 2.4-GHz band comprising a sensitivity of −72 dBm. The data rate amounts to 62.5 kbps. The 14-nm CMOS design digitalizes the internal signal with a 6-bit ADC. The external time basis is a 32-KHz oscillator. 95 µW are too high for a battery operation of several years.

[7] describes a superhet receiver with a power consumption of 41 µW that reaches a sensitivity of −78 dBm. Detection of the wake-up sequence as well as the receiver address is carried out externally with a LF wakeup receiver, and not internally, as is the case in [5]. With 41 µW, the battery operation with a button cell (e.g. AG 13, 130 mAh) is possible for just five months.

SUMMARY

An embodiment may have a data receiver, wherein the data receiver is configured to receive a signal comprising a sequence of N bits so as to obtain a reception signal, wherein N is a natural number greater than or equal to eight, N≥8, wherein the data receiver is configured to sample the reception signal with a sampling rate that corresponds, with an intentional deviation of up to 2/N, to one sample value per bit of the sequence of N bits so as to obtain a sequence of received bits, wherein the data receiver is configured to correlate the sequence of received bits with K different sequences of N-1 reference bits so as to obtain K partial correlation results, wherein K is smaller than or equal to N-1 and greater than or equal to three, N-1≥K≥3, wherein the K different sequences of reference bits are differently punctured versions of the same base sequence of N reference bits, wherein the data receiver is configured to detect the sequence of N bits when at least one of the K partial correlation results exceeds a detection threshold.

Another embodiment may have a data receiver, wherein the data receiver is configured to receive an OOK-modulated signal comprising a sequence of 31 bits so as to obtain a reception signal, wherein the data receiver is configured to sample the reception signal with a sampling rate that corresponds, with an intentional deviation of up to 7%, to one sample value per bit of the sequence of 31 bits so as to obtain a sequence of received bits, wherein the data receiver is configured to correlate the sequence of received bits with 5 different sequences of 30 reference bits so as to obtain 5 partial correlation results, wherein the 5 different sequences of reference bits are differently punctured versions of the same base sequence of 31 reference bits, wherein the data receiver is configured to detect the sequence of 31 bits if at least one of the 5 partial correlation results exceeds a detection threshold.

Another embodiment may have a method for detecting a sequence of N bits of a reception signal, wherein the method comprises: receiving a signal comprising a sequence of N bits so as to obtain a reception signal, wherein N is a natural number greater than or equal to eight, N 8, sampling the reception signal with a sampling rate that corresponds, with an intentional deviation of up to 2/N, to one sample value per bit of the sequence of N bits so as to obtain a sequence of received bits, correlating the sequence of received bits with K different sequences of N-1 reference bits so as to obtain K partial correlation results, wherein K is smaller than or equal to N-1 and greater than or equal to three, N-1≥K≥3, wherein the K different sequences of reference bits are differently punctured versions of the same base sequence of N reference bits, detecting the sequence of N bits when at least one of the K partial correlation results exceeds a detection threshold.

Another embodiment may have a non-transitory digital storage medium having a computer program stored thereon to perform the method for detecting a sequence of N bits of a reception signal, wherein the method comprises: receiving a signal comprising a sequence of N bits so as to obtain a reception signal, wherein N is a natural number greater than or equal to eight, N≥8, sampling the reception signal with a sampling rate that corresponds, with an intentional deviation of up to 2/N, to one sample value per bit of the sequence of N bits so as to obtain a sequence of received bits, correlating the sequence of received bits with K different sequences of N-1 reference bits so as to obtain K partial correlation results, wherein K is smaller than or equal to N-1 and greater than or equal to three, N-1≥K≥3, wherein the K different sequences of reference bits are differently punctured versions of the same base sequence of N reference bits, detecting the sequence of N bits when at least one of the K partial correlation results exceeds a detection threshold, when said computer program is run by a computer.

Embodiments provide a data receiver, wherein the data receiver is configured to receive a signal comprising a sequence of N bits so as to obtain a reception signal, wherein N is a natural number greater than or equal to eight, N≥8, wherein the data receiver is configured to sample the reception signal with a sampling rate that corresponds, with an intentional deviation of up to 2/N [e.g. up to 5% [e.g. 3% to 5%]], to one sample value per bit of the sequence of N bits so as to obtain a sequence of received bits, wherein the data receiver is configured to correlate the sequence of received bits with K different sequences of N-1 reference bits so as to obtain K partial correlation results, wherein K is smaller than or equal to N-1 and greater than or equal to three, N-1≥K≥3, wherein K different sequences of reference bits are differently punctured versions of the same base sequence of N reference bits, wherein the data receiver is configured to detect the sequence of N bits if at least one of the K partial correlation results exceeds a detection threshold.

Thus, embodiments provide a sampling radio receiver that is able to receive data (e.g. correlation sequences) without synchronization. Sampling is carried out non-coherently with one sample value per bit. Oversampling (e.g. with a factor 4, 8 or 16) can be omitted in the radio receiver. Current consumption is reduced accordingly by the factor 4, 8 or 16. Embodiments are based on parallel processing of the correlation sequences with puncturing at different bit positions. Embodiments do without time delay, i.e. there is no delaying closed-loop control. Thus, data reception is done without interruption. Omission of the oversampling significantly decreases the receiver current consumption, omission of a synchronization message shortens the transmission time at the transmitter and the receiver.

Through the method of the single sampling used in embodiments, it is possible to implement sampling radio receivers that consume less power by almost one order of magnitude.

BRIEF DESCRIPTION OF THE DRAWINGS

Embodiments of the present invention will be detailed subsequently referring to the appended drawings, in which:

FIG. 4 shows, in a table overview, using the example of binary bit sequences for OOK modulation of a HF carrier signal, how many bit errors are allowed in the worst case for a binary correlation when the best correlation sequence is selected according to the sequence length N, FIG. 5 a schematic view of a transmitted sequence of bits with a transmission data rate $DR_{TX}$ and a received sequence of bits resulting from sampling the transmitted sequence of bits with the sampling rate (receiver data rate) $DR_{RX}$ that is smaller than the transmission data rate $DR_{TX}$, FIG. 6 a schematic view of a transmitted sequence of bits with a transmission data rate $DR_{TX}$ and a received sequence of bits resulting from sampling the transmitted sequence of bits with the sampling rate (receiver data rate) $DR_{RX}$ that is greater than the transmission data rate $DR_{TX}$, FIG. 7 a schematic view of a transmitted sequence of bits with a transmission data rate $DR_{TX}$ and a received sequence of bits resulting from sampling the transmitted sequence of bits with the sampling rate (receiver data rate) $DR_{RX}$ that is equal to the transmission data rate $DR^{TX}$.

DETAILED DESCRIPTION OF THE INVENTION

In the subsequent description of the embodiments of the present invention, the same elements or elements having the same effect are provided with the same reference numerals in the drawings so that their description is interchangeable.

Figure 2:
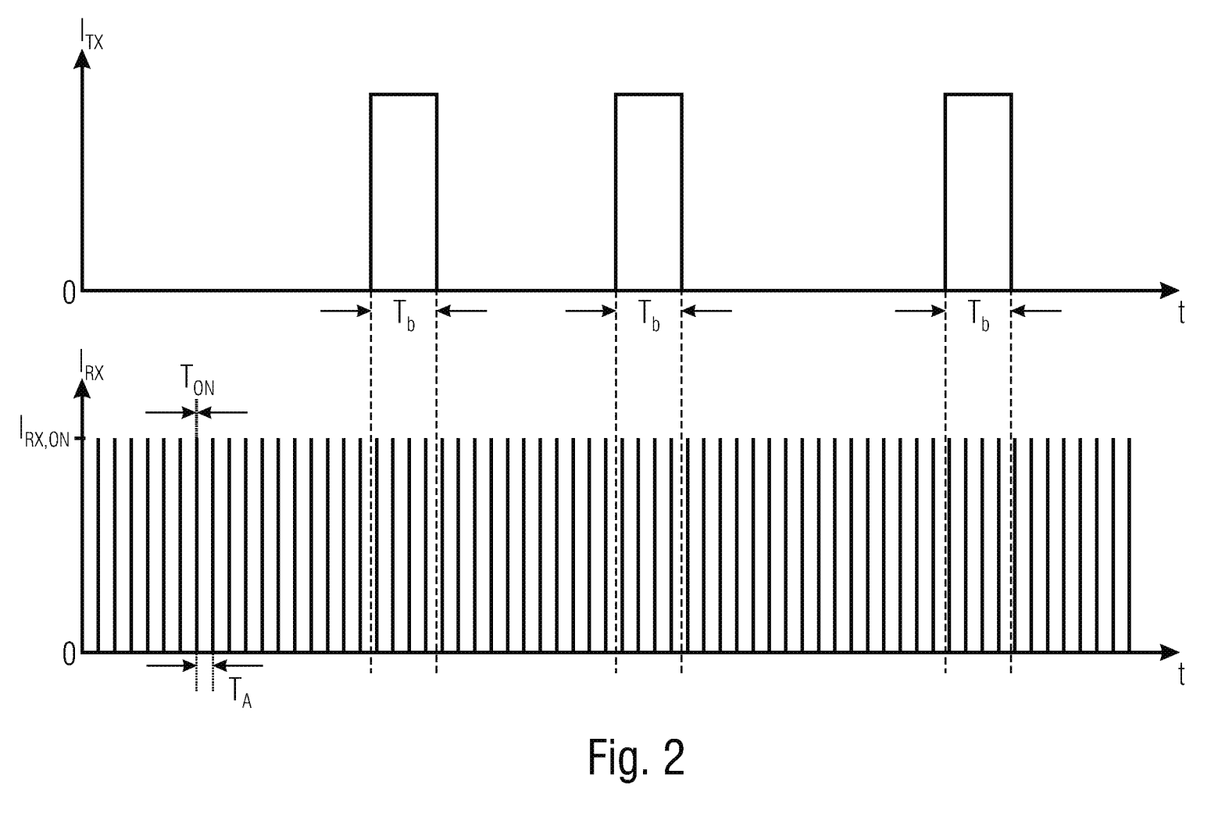
FIG. 2 shows a schematic view of an exemplary quadruple oversampling of OOK-modulated pulses.

Sampling radio receivers (or sampling receivers) (usually) take a signal sample in a cyclical manner from the connected antenna. During a sampling process, the analog receiver is switched on for the duration $T_{ON}$. The sampling rate may either be derived directly or by frequency division from a digital clock signal. The current consumption of the sampling radio receiver is directly proportional to the sampling rate. The sampling radio receiver is not synchronized with the radio telegram emitted by one or several radio transmitters. Thus, additional effort can be omitted at the transmitter (e.g. sync telegrams) and at the receiver. This also saves time within the radio emission and occupies the radio channel less, enabling a higher number of radio participants. For example, a so-called CDR circuit (CDR=Clock and Data Recovery) may be employed as a circuit for the precise adjustment of the phase for the respective sampling time. The current consumption of such circuits is often significantly above 1 mA, which is a stark contrast to the goal of a "power-saving radio receiver with less than 10 µA". When using methods with oversampling, more samples per bit are obtained. The current consumption increases with the factor of the oversampling. For example, FIG. 2 assumes quadruple oversampling. If the RF carrier signal is OOK-modulated, the transmission current ITX corresponds to the transmitted bit data of the width Tb. Here, four coherent samples each result in the direct image of the respective bit. However, the receiver lacks the temporal assignment of the individual sample values. For example, this may be determined by means of an integrator (e.g. with a memory length of four). However, it may also occur that individual sample values are formed at the OOK signal edges—i.e. at the 0-1 or 1-0 transitions, and that these may be uncertain. In this case, instead of four, five or three sample values may correspond to the respective bit. This uncertainty in the determined bit length may have a disturbing effect, in particular in the case of low oversampling (e.g. two to four), and may lead to wrong decisions in the reconstruction of the transmitted bits (data errors). Higher oversampling (e.g. of eight) tends to be less critical, however, also comprises a significantly larger mean current consumption. The uncertainty at the bit edges is composed of several contributions: The transmitter phase noise, the type of the transmitter envelope in the OOK modulation with a modulation degree of 100%, and the receiver phase noise, among other things.

The embodiments described in the following enable operating the receiver without oversampling, i.e. with only one sample per bit, so as to significantly reduce the mean current consumption of the radio receiver.

Figure 3:
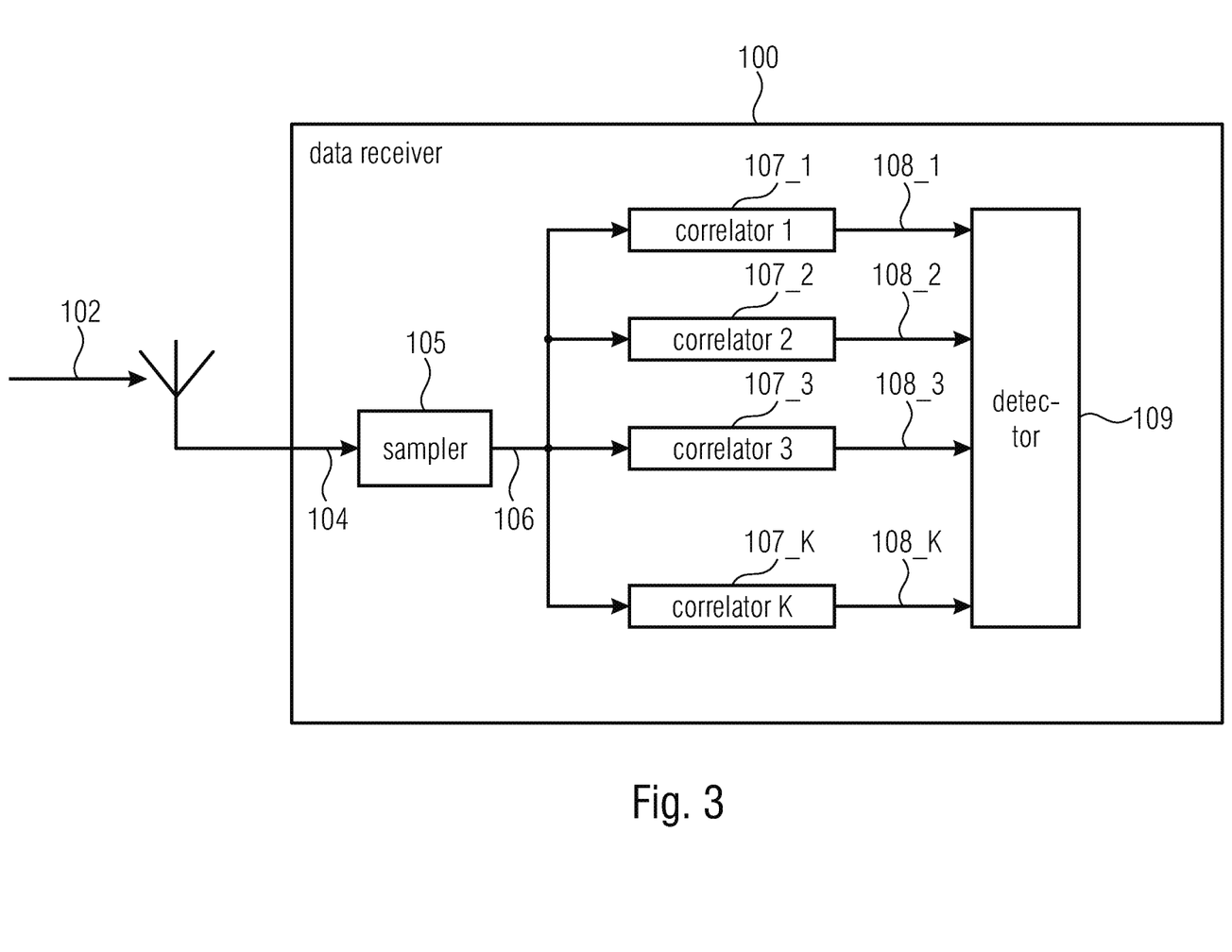
FIG. 3 shows a schematic block circuit diagram of a data receiver (radio receiver) according to an embodiment of the present invention.

FIG. 3 shows a schematic block circuit diagram of a data receiver 100 (radio receiver) according to an embodiment of the present invention. The data receiver 100 is configured to receive a signal 102 comprising a sequence of N bits so as to obtain a reception signal 104, wherein N is a natural number greater than or equal to eight, N≥8. Furthermore, the data receiver 100 is configured to sample the reception signal 104 with a sampling rate $DR_{RX}$ that corresponds, with an intentional deviation of up to 2/N, e.g. up to 5% (e.g. 3% to 5%) (i.e. the sampling rate, or receiver data rate, $DR_{RX}$ differs from the transmission data rate $DR_{TX}$), to one sample value per bit of the sequence of N bits so as to obtain a sequence 106 of received bits. In addition, the data receiver 100 is configured to correlate the sequence 106 of received bits with K different sequences of N-1 reference bits so as to obtain K partial correlation results 108_1-108_K, wherein K is smaller than or equal to N-1 and greater than or equal to three, N-1≥K≥3, wherein the K different sequences of reference bits are differently punctured versions of the same base sequence of N reference bits. The data receiver 100 is further configured to detect the sequence 106 of the N bits if at least one of the K partial correlation results 108_1-108_K exceeds a detection threshold.

As is shown in FIG. 3, according to an embodiment, the data receiver 100 may comprise a sampler 105, K correlators 107_1-107_K and a detector 109.

The sampler 105 may be configured to sample the reception signal 104 with a sampling rate that corresponds, with an intentional deviation of up to 2/N, e.g. up to 5% (e.g. 3% to 5%), to one sample value per bit of the sequence of N bits so as to obtain the sequence 106 of received bits.

The K correlators 107_1-107_K may be configured to correlate the sequence 106 of received bits with K different sequences of N-1 reference bits so as to obtain the K partial correlation results 108_1-108_K. In this case, a k-th correlator of the correlators 107_1-107_K may be configured to correlate the sequence 106 of received bits with a k-th sequence of N-1 reference bits so as to obtain a k-th partial correlation result of the K partial correlation results 108_1-108_K, wherein k is a control variable (natural number) of 1 to K.

The detector 109 may be configured to detect the sequence 106 of N bits when at least one of the K partial correlation results 108_1-108_K exceeds a detection threshold.

In embodiments, the sequence 106 of received bits may comprise a length of N-1 bits.

In embodiments, the number K of different sequences of N-1 reference bits may depend on a number F of tolerable errors, as follows:

K=[N/F]

wherein F is a natural number greater than or equal to one and smaller than or equal to N/3, N/3≤F≤1.

In embodiments, the transmitted bit sequence may comprise N bits. For detection, in embodiments, N-1 punctured correlators of the length N-1 may be constructed (full cover in case of the phenomenon that one bit is missing on the reception side). In embodiments, however, less than N-1 punctured correlators of the length N-1 may be constructed as well, however, at least three correlators of the length N-1 when the detection of the correlation sequence is carried out in an error-tolerant way.

As mentioned above, in embodiments, N is assumed to be at least 8.

Embodiments may assume a N-bit sequence with a tolerance of up to a maximum of F arbitrarily distributed bits errors.

For example, in case of a sequence of N=31 and in case of a maximum of F=6 tolerable errors, the sequence length N=31 may be divided by F=6 so that K=5 partial correlators suffice in this case. In general, the minimum number K of partial correlators is N divided by F, but in principle at least three.

The exemplary 31-bit sequence may be punctured for the first time at the fourth (6 : 2+1, i.e. F : 2+1) position so that the first partial correlator comprises a length of N−1=30 bits. The next puncturing of the 31-bits code is carried out F=6 bits further, etc. Thus, puncturing the take place at the original positions of the 31-bit sequence: 4, 10, 16, 22, 28.

Generally: F: 2+1, F: 2+F+1, F: 2+2 F+1, F: 2+3 F+1, F: 2+4 F+1, . . . , N−F :2.

Now, through a sampling rate mismatch (e.g. 3% . . . 5%; 3%=100% /N), the compression error may occur anywhere within the five correlators. If the compression occurs at positions 1, 2, 3 or 4, the bit errors made are generally (!) at most 3 errors, at best 0 errors. After the puncturing, the bits (RX sequence and TX sequence) match again. If the compression position is located at position 5, 6, or 7, the first correlator is the most favorable here as well. In general, there is a maximum of 3 bit errors. If the compression takes place at position 8, 9 or 10, 11, 12 or 13, the third correlator is the most favorable. The comparison of the correlation value with a ≥-threshold in each correlator results in a binary signal. All binary signals obtained from the correlators in such a way may be logically OR-linked so as to obtain the entire "code match" signal. Obviously, it depends on the locations of the zeros and ones. In general, this is not known, thus a maximum of 3 bit errors, with concrete bit sequences, there are often less bit errors. In certain cases, there may even be 0 bit errors. The correlators then have to process further bit errors due to disturbed transmission. There are no further compressions. Overall, in the case of the "most favorable" correlator, there is a maximum number of F : 2 bit errors due to the compression.

Figure 4:
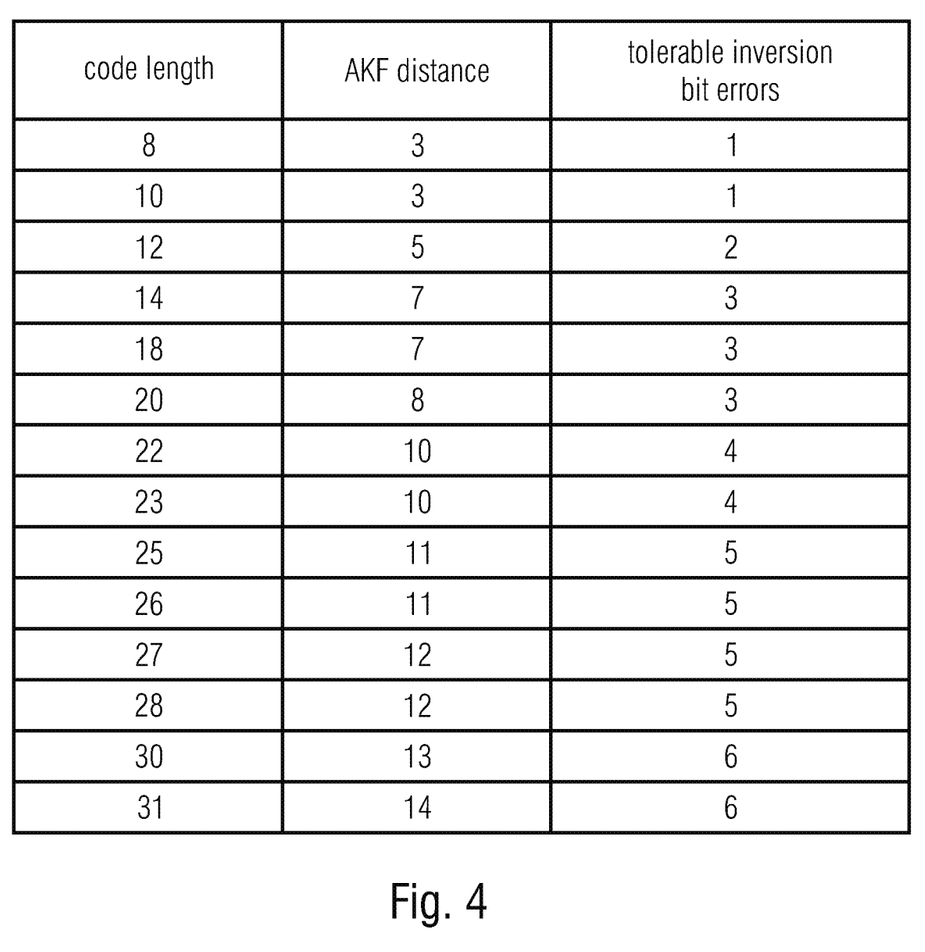

The table shown in FIG. 4 shows, using the example of binary bit sequences for OOK modulation of a HF carrier signal, how many bit errors are allowed in the worst case for a binary correlation when the best correlation sequence is selected according to the sequence length N. This was determined by means of a code search. In this case, the maximum distance between the CCF main and auxiliary maximum was the measure of quality, also in the case of arbitrarily distributed F bit errors. Thus, the property of a pseudo-random sequence is pursued (ideal case: ACF or CCF is the Dirac impulse).

In embodiments, the data receiver 100 may be configured to puncture the base sequence of N reference bits at the p-th position so as to obtain the k-th sequence of the K different sequences of N-1 reference bits:

p=(F/2+1)+(k−1)·F wherein k is control variable of 1 to K.

In embodiments, the sampling rate $DR_{RX}$ may be smaller than a data rate $DR_{TX}$ of the signal 102, e.g. by 2/N, e.g. 3% to 5%.

In embodiments, the signal 102 may be OOK-modulated (OOK=On-Off Keying).

Detailed embodiments of the present invention are described in the following.

To this end, the effect of the different data rates is first described.

As mentioned above, embodiments use a sampling method without oversampling. Embodiments differentiate between the transmission data rate $DR_{TX}$ and the receiver data rate $DR_{RX}$, wherein the transmission data rate $DR_{TX}$ and the receiver data rate $DR_{RX}$ are selected to be different.

In embodiments, a certain bit sequence of the length L (e.g. 31 bits) is to be transmitted. To this end, four cases are examined in the following.

Figure 5:
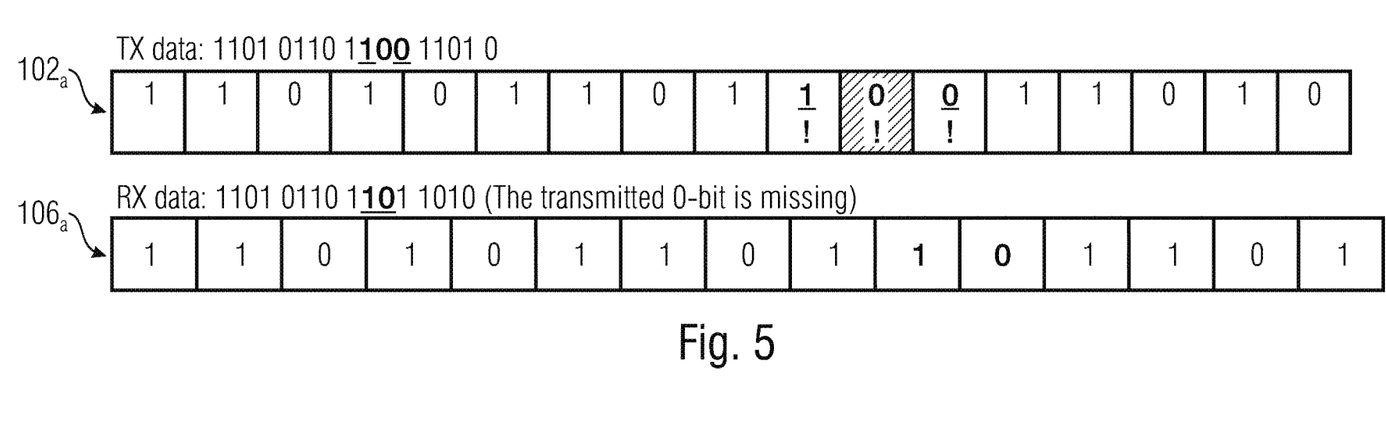

According to a first case, the transmission data rate $DR_{Tx}$ is greater than the receiver data rate $DR_{RX}$, i.e. $DR_{TX} > DR_{RX}$, which is why there is a compression of the bit stream, as is shown in FIG. 5. In detail, FIG. 5 shows a schematic view of a transmitted sequence 102a of bits with a transmission data rate $DR_{TX}$ and a received sequence 106a of bits resulting from sampling the transmitted sequence 102a of bits with the sampling rate (receiver data rate) $DR_{RX}$ that is smaller than the transmission data rate $DR_{TX}$. As can be seen in FIG. 5, a transmitted 0-bit is missing in the received sequence 106a of bits. If the transmission data rate $DR_{TX}$ is greater than the receiver data rate $DR_{RX}$, there is the case that transmitted bits are missing in the bit stream of the receiver. In general, the defect is not predictable in operation.

Figure 6:
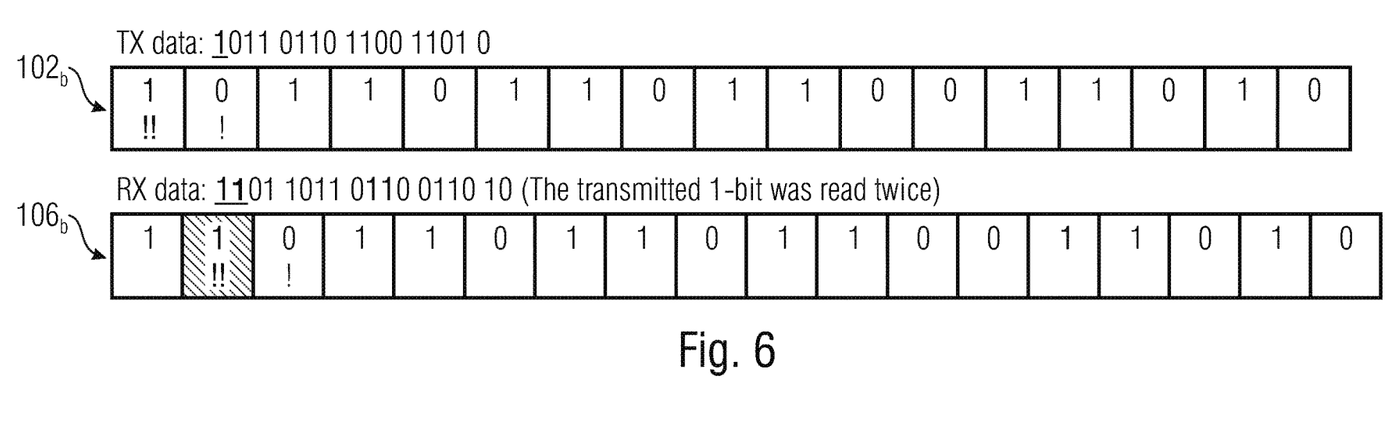

According to a second case, the transmission data rate $DR_{TX}$ is smaller than the receiver data rate $DR_{RX}$, i.e. $DR_{TX} > DR_{RX}$, which is why there is an expansion of the bit stream, as is shown in FIG. 6. In detail, FIG. 6 shows a schematic view of a transmitted sequence 102b of bits with a transmission data rate $DR_{Tx}$ and a received sequence 106b of bits resulting from sampling the transmitted sequence 102b of bits with the sampling rate (receiver data rate) $DR_{RX}$ that is greater than the transmission data rate $DR_{Tx}$. As can be seen in FIG. 6, a transmitted 1-bit was read twice. If the transmission data rate $DR_{Tx}$ is smaller than the receiver data rate $DR_{RX}$, there is the case that transmitted bits occur several times in the bit stream of the receiver. In general, the repetition position is not predictable in operation.

Figure 7:
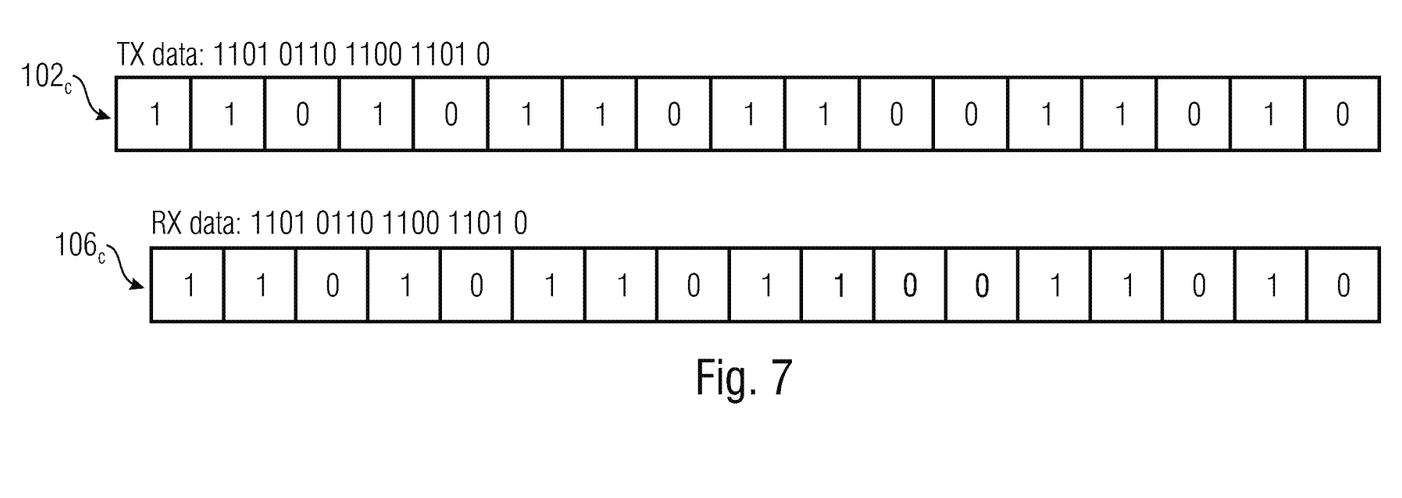

According to a third case, the transmission data rate $DR_{TX}$ is equal to the receiver data rate $DR_{RX}$, i.e. $DR_{TX} = DR_{RX}$, as is shown in FIG. 7. In detail, FIG. 7 shows a schematic view of a transmitted sequence 102c of bits with a transmission data rate $DR_{TX}$ and a received sequence 106c of bits resulting from sampling the transmitted sequence 102c of bits with the sampling rate (receiver data rate) $DR_{RX}$ that is equal to the transmission data rate $DR_{TX}$. As can be seen in FIG. 7, transmitted bits are correctly mapped in the bit stream of the receiver. There are no defects. The sampling times do not match the bit edges. This is the desired reception case.

Figure 8:
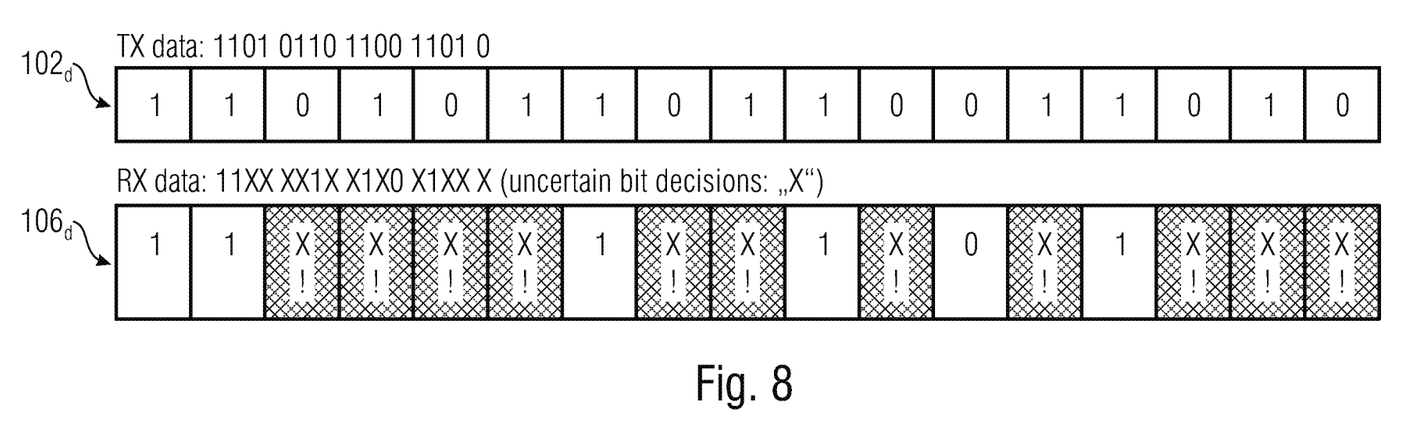
FIG. 8 shows a schematic view of a transmitted sequence of bits with a transmission data rate $DR_{TX}$ and a received sequence of bits resulting from sampling the transmitted sequence of bits with the sampling rate (receiver data rate) $DR_{RX}$ that is equal to the transmission data rate $DR_{TX}$ when the sampling times coincide with the bit edges.

According to a fourth case, the transmission data rate $DR_{TX}$ is equal to the receiver data rate $DR_{RX}$, i.e. $DR_{TX} = DR_{RX}$, however, wherein the sampling times match the bit edges, as is shown in FIG. 8. In detail, FIG. 8 shows a schematic view of a transmitted sequence 102d of bits with a transmission data rate $DR_{TX}$ and a received sequence 106d of bits resulting from sampling the transmitted sequence 102d of bits with the sampling rate (receiver data rate) $DR_{RX}$ that is equal to the transmission data rate $DR_{TX}$ when the sampling times match the bit edges. As can be seen in FIG. 8, a great number of transmitted bits are wrongly mapped in the bit stream of the receiver. The bit decisions in the receiver are uncertain at the bit edges. This where the defects are.

The third case or the fourth case could occur for the same transmission and receiver data rates- In particular, the fourth case (many RX bit errors) could occur in an unforeseen manner and for a longer time, e.g. in the lab operation for transmission tests or in the field in case of little temperature deviation. Radio transmission is then no longer possible. Direct sampling, i.e. "without oversampling", is not viable without further measures. Here, the relative phase position of the TX and RX data stream is decisive.

The first case and the second case are conceivable if compression or spreading of the bit streams in the receiver is tolerated. If, instead of raw bit data, special correlation sequences (e.g. as spreading codes) that represent certain data bits are transmitted, the reconstruction may also be successful with defects without oversampling. With the second case ($DR_{TX} < DR_{RX}$), there is an expansion of the bit stream. Transmitted bits may occur twice instead of once in the bit stream of the receiver. If the transmission data rate is selected to be lower than the receiver data rate according to:

$$\frac{DR_{RX} - DR_{TX}}{DR_{RX}} \geq \frac{1}{L}$$

in the case of the equal symbol, the reception bit sequence will have a length of L+1 and the transmission bit sequence will have a length of L. That means that correlators in the receiver have to be extended by 1 bit. Since the insertion position with the duplication ("defect") is not known a priori, the proposition is to implement L correlators with other reference sequences, respectively. The L different references sequences may easily be generated by the L different cases of the bit duplication. In each case, one of the correlators will successfully trigger since the a priori duplication is mapped there in the reference code.

For more efficient implementation, according to embodiments, a lower number of correlators is pursued. This saves chip area, reduces the dynamic and static digital current consumption. If the correlation sequences are selected appropriately, i.e. the auto-correlation and cross-correlation functions have a sharply defined maximum with low secondary maxima that remain low even with transmission errors (postulate of the error tolerance of the code), a reduced number of correlators can be implemented.

The first case is more favorable if the transmission data rate $DR_{TX}$ is selected to be greater than the reception data rate $DR_{RX}$. Then, the length of the correlators is shortened instead of extended, leading to a lower number of digital memory cells, or shorter registers. According to embodiments, not all of the possible L-1 implementations of correlators may here be provided, but only a selection thereof.

For the first case shown in FIG. 5, there are 17 possible correlation sequences of the length of 16 bits:

_101 0110 1100 1101 0
1_01 0110 1100 1101 0
11_1 0110 1100 1101 0
110_0110 1100 1101 0
1101_110 1100 1101 0
1101 0_10 1100 1101 0
1101 01_0 1100 1101 0
1101 011_1100 1101 0
1101 0110_100 1101 0
1101 0110 1_00 1101 0
1101 0110 11_0 1101 0
1101 0110 110_1101 0
1101 0110 1100_101 0

1101 0110 1100 1_01 0
1101 0110 1100 11_1 0
1101 0110 1100 110_0
1101 0110 1100 1101_

If a selection of correlation sequences is used instead under the assumption of the error tolerance (e.g. 2 bit errors within the 17-bit sequence), puncturing may be carried out at the $3^{rd}$, $6^{th}$, $9^{th}$, $12^{th}$ and $15^{th}$ positions:

11_1 0110 1100 1101 0
1101 0_10 1100 1101 0
1101 0110_100 1101 0
1101 0110 110_1101 0
1101 0110 1100 11_1 0

If the actual compression takes place one or two bits in front of or behind a sequence punctuation (_), a maximum of two, at best none at all, bit errors can be made between the compression position and the puncturing position.

For example, an actual compression ("\") may occur at the third position:

110\ 0110 1100 1101 0, i.e.:
1100 1101 1001 1010

Thus, the following reference sequences have the following number of errors:

| | |
|---|---|
| 11_1 0110 1100 1101 0 | 1 error |
| 1101 0_10 1100 1101 0 | 2 errors |
| 1101 0110 _100 1101 0 | 4 errors |
| 1101 0110 110_ 1101 0 | 5 errors |
| 1101 0110 1100 11_1 0 | 7 errors |

In this case, with an error tolerance "2 of 17", the two first reference sequences could positively trigger in a correlator. This example shows that a selection of five correlators instead of 16 is already sufficient to detect the punctured reception sequence. In principle, it is not important which of the correlators triggers. Thus, the correlator decisions can be logically OR-linked.

For implementations with 31-bit sequences and an error tolerance of five arbitrary bit errors, the proposition is to implement five correlators (of the length of 30 bits) with a puncturing at the following positions (cf. FIG. 9):

Position 3, position 9, position 15, position 21, position 27

Figure 9:
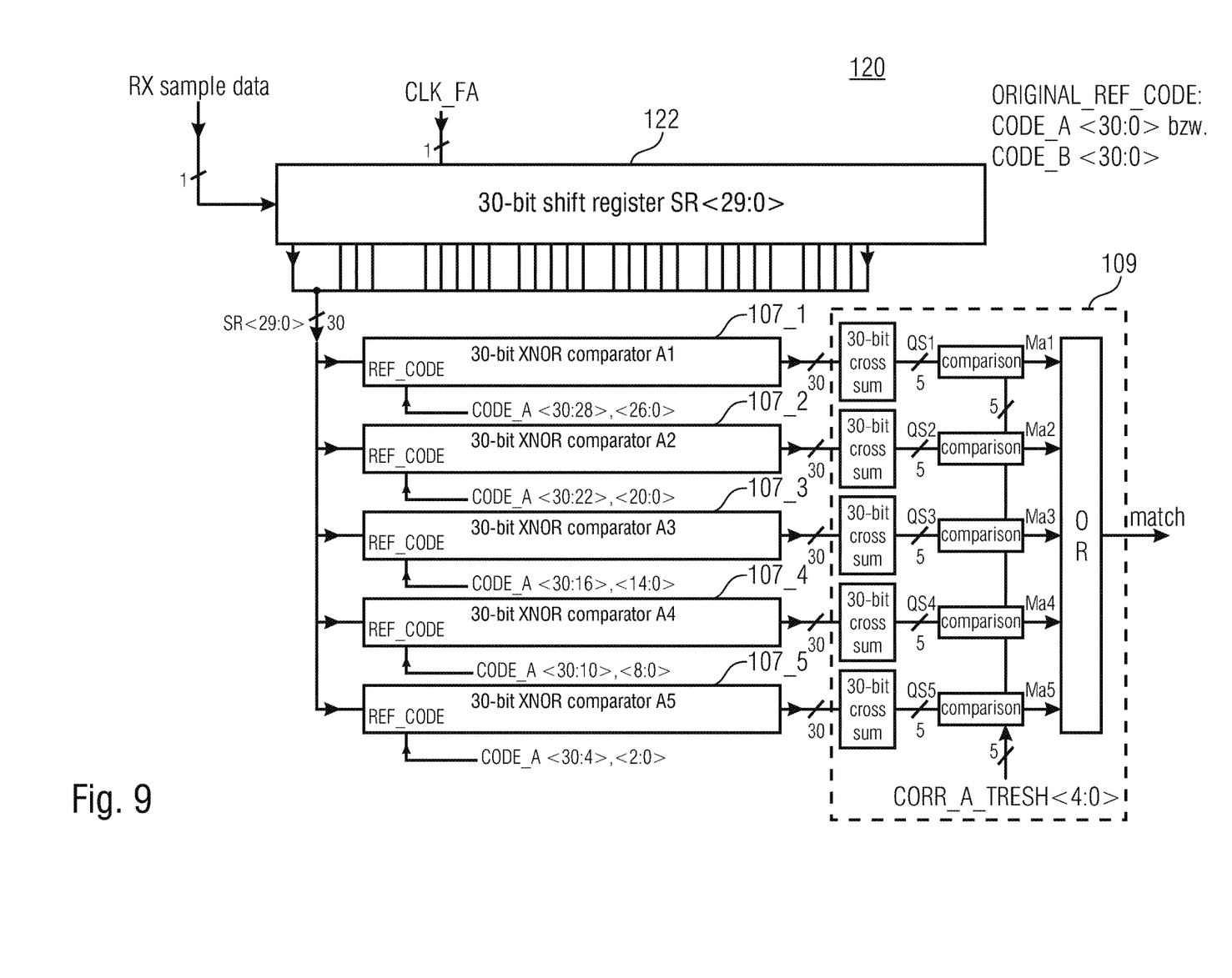
FIG. 9 shows a schematic block circuit diagram of a correlation stage of the data receiver according to an embodiment of the present invention.

A "match" signal resulting from the logical OR-processing of the match signals Ma1 to Ma5 of the five punctured correlators, as is shown in FIG. 9, showing an example for a set of five 30-bits binary correlators with different punctuations, can be formed as a correlator total result. In detail, FIG. 9 shows a schematic block circuit diagram of a correlation stage 120 of the data receiver 100 according to an embodiment of the present invention. The correlation stage 120 includes a 30-bit shift register 122, K=5 correlators 107_1-107_K (K=5), e.g., each implemented as a 30-bit XNOR-comparator, and a detector 109 that triggers if at least one of the K=5 partial correlation results exceeds a detection threshold.

Figure 10:
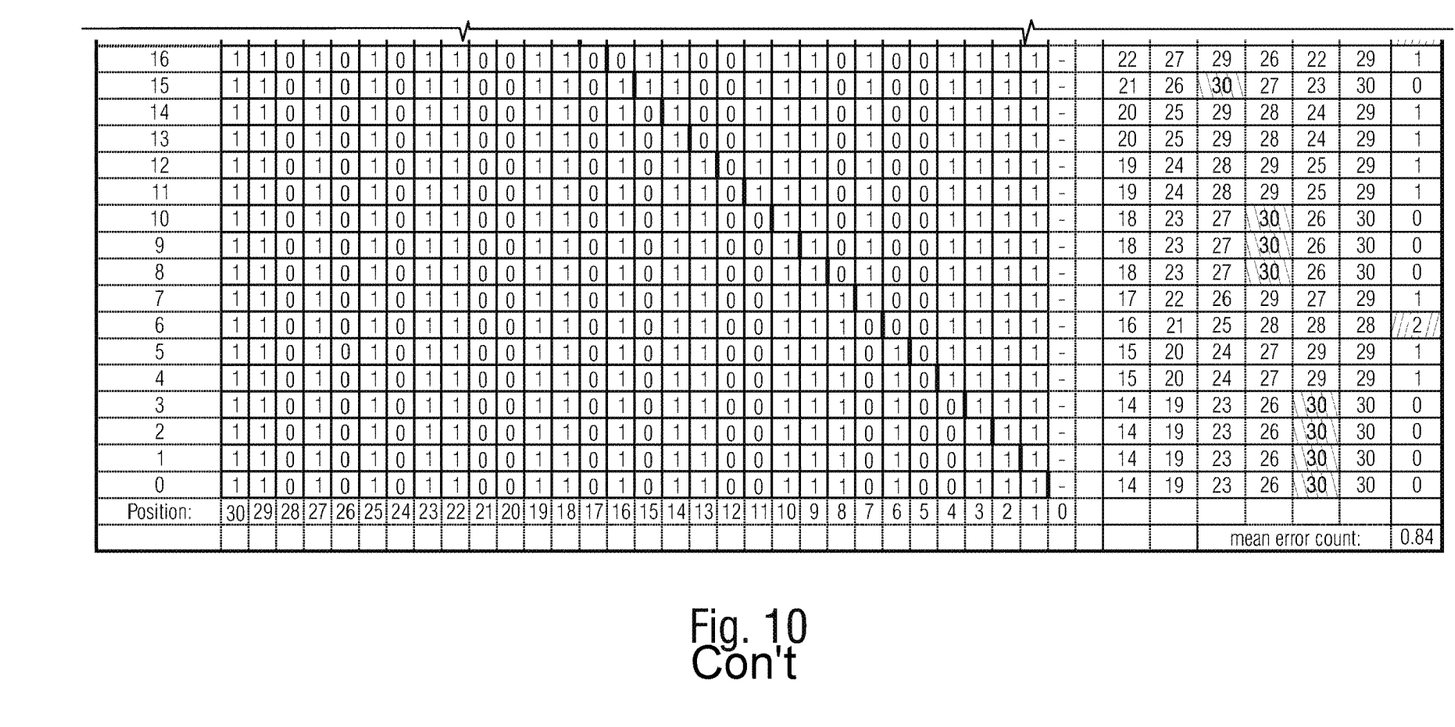
FIG. 10 shows, in a table, a bit error statistic for 30 different cases of the compression of the bit stream.

FIG. 10 shows, in a table, a bit error statistic for 30 different cases of compression of the bit stream. The error statistic shown as a table in FIG. 10 explains the detection of the RX sequences with the punctured correlators ("A1"-"A5"). On the far right, the actual error number is shown when all of the 30 cases are run for the actual compression of the bit stream. For the equal distribution, there is a mean error number of 0.84 bits at a maximum error number of 2. In eleven of 30 cases (approximately 36.7%), there are no bit errors within the 30-bit sequences. In approximately 43% of the cases, there is only one bit error within the 30-bit sequences.

In case of the puncturing, according to the table shown in FIG. 10, there may be up to two bit errors, even though the reception of the bit sequence was free of errors. Thus, in operation, the correlator threshold CORR_A_THRESH has to be lowered by up to two. For threshold values generally selected to be lower, e.g. at 25, there may be confusions with other correlation codes. Thus, the bit errors resulting from the puncturing have a minimum effect on the achievable sensitivity. Practical experiences with lab measurements show a sensitivity that is lower by approximately 1 dB. This is a tolerable limitation.

The direct sampling method with punctured correlators described herein according to embodiments enables the omission of separate synchronization methods in radio transmission. This saves transmission time, lowers the system latency, and increases the maximum number of radio participants per second. Furthermore, the radio receiver does not have to contain elaborate highly-precise local oscillator frequency processing with integrated phase-locked loops and high-frequency quartzes. Instead, low-cost clock quartzes may be used, which also have a current consumption of less than 1 µA as a quartz oscillator. This is not the case for high-frequency oscillator circuits; more than 1 mA has to be expected here. The method described herein according to embodiments does not require any feedback by the radio receiver (a radio feedback channel is not required) and enables in any case the reception and successful decoding of OOK radio sequences. Furthermore, the method described herein according to embodiments is even suitable to allow error-tolerant OOK decoding with correlation. This would be an additional requirement to be met fora separate synchronization circuit: in the implementation and in the actual radio transmission. Failure to detect a synchronization message would lead to a total loss of the subsequent radio message. In this case, the method described herein according to embodiments is also of advantage.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM ora FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device ora system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF REFERENCES

[1] X. Huang, S. Rampu, X. Wang, G. Dolmans, H. de Groot: "A 2.4GHz/915MHz 51 μW Wake-Up Receiver with Offset and Noise Suppression" in: 2010 IEEE International SolidState Circuits Conference Digest of Technical Papers (2010), pp. 222-223

[2] J. L. Bohorquez, A. P. Chandrakasan, and J. L. Dawson: "A 350μW CMOS MSK Transmitter and 400μW OOK Super-Regenerative Receiver for Medical Implant Communications" in: IEEE Journal of Solid-State Circuits (VLSI Symposium Special Issue), pp. 1248-1259, Apr. 2009.

[3] S. Drago, D. M. Leenaerts, F. Sebastiano, L. J. Breems, K. A. Makinwa, B. Nauta: "A 2.4GHz 830pJ/bit Duty-Cycled Wake-Up Receiver with -82dBm Sensitivity for CrystalLess Wireless Sensor Nodes" in: 2010 IEEE International SolidState Circuits Conference Digest of Technical Papers (2010), pp. 224-225

[4] US 2008/108318 A1

[5] R. Piyare, A. L. Murphy, C. Kiraly, P. Tosato and D. Brunelli, "Ultra Low Power Wake-Up Radios: A Hardware and Networking Survey," in IEEE Communications Surveys & Tutorials, vol. 19, no. 4, pp. 2117-2157, Fourthquarter 2017.

[6] E. Alpman et al., "95 μW 802.11g/n compliant fully-integrated wake-up receiver with -72dBm sensitivity in 14 nm FinFET CMOS," 2017 IEEE Radio Frequency Integrated Circuits Symposium (RFIC), Honolulu, HI, 2017, pp. 172-175.

[7] E. T. Armas, D. Ramos-Valido, S. L. Khemchandani and J. del Pino, "A 40.9 μW high sensitivity wake-up radio for wireless sensor networks using uncertain-IF architecture," 2015 Conference on Design of Circuits and Integrated Systems (DCIS), Estoril, 2015, pp. 1-6.

[8] WO 201 3/1 31 963 A1

[9] EP 2591557 B1

The invention claimed is:

1. Data receiver, comprising:
   a sampler,
   a correlator, and
   a detector,
   wherein the data receiver is configured to receive a signal comprising a sequence of N bits so as to acquire a reception signal, wherein N is a natural number greater than or equal to eight, N≥8,
   wherein the sampler is configured to sample the reception signal with a sampling rate that corresponds, with an intentional deviation of up to 2/N, to one sample value per bit of the sequence of N bits so as to acquire a sequence of received bits,
   wherein the correlator is configured to correlate the sequence of received bits with K different sequences of N-1 reference bits so as to acquire K partial correlation results, wherein K is smaller than or equal to N−1 and greater than or equal to three, N−1≥K≥3, wherein the K different sequences of reference bits are differently punctured versions of the same base sequence of N reference bits, wherein the detector is configured to detect the sequence of N bits when at least one of the K partial correlation results exceeds a detection threshold.

2. Data receiver according to claim 1, wherein the number K of different sequences of N−1 reference bits depends on a number F of tolerable errors as follows:

K=[N/F]

wherein F is a natural number greater than or equal to one and smaller than or equal to N/3, N/3≤F≤1.

3. Data receiver according to claim 1, wherein the correlator is configured to puncture the base sequence of N reference bits at the p-th position so as to acquire the k-th sequence of the K different sequences of N−1 reference bits:

p=(F/2+1)+(k−1)·F wherein k is control variable of 1 to K.

4. Data receiver according to claim 1, wherein the sequence of received bits has a length of N−1 bits.

5. Data receiver according to claim 1, wherein the sampling rate is smaller than a data rate of the signal.

6. Data receiver according to claim 1, wherein the signal is OOK-modulated.

7. Data receiver according to claim 1, wherein N=31 and K=5.

8. Data receiver, comprising:

a sampler, a correlator, and a detector, wherein the data receiver is configured to receive an OOK-modulated signal comprising a sequence of 31 bits so as to acquire a reception signal, wherein the sampler is configured to sample the reception signal with a sampling rate that corresponds, with an intentional deviation of up to 7%, to one sample value per bit of the sequence of 31 bits so as to acquire a sequence of received bits, wherein the correlator is configured to correlate the sequence of received bits with 5 different sequences of 30 reference bits so as to acquire 5 partial correlation results, wherein the 5 different sequences of reference bits are differently punctured versions of the same base sequence of 31 reference bits, wherein the data receiver detector is configured to detect the sequence of 31 bits if at least one of the 5 partial correlation results exceeds a detection threshold.

9. Method for detecting a sequence of N bits of a reception signal, wherein the method comprises:

receiving a signal comprising the sequence of N bits so as to acquire a reception signal, wherein N is a natural number greater than or equal to eight, N≥8, sampling the reception signal with a sampling rate that corresponds, with an intentional deviation of up to 2/N, to one sample value per bit of the sequence of N bits so as to acquire a sequence of received bits, correlating the sequence of received bits with K different sequences of N−1 reference bits so as to acquire K partial correlation results, wherein K is smaller than or equal to N−1 and greater than or equal to three, N−1≥K≥3, wherein the K different sequences of reference bits are differently punctured versions of the same base sequence of N reference bits, detecting the sequence of N bits when at least one of the K partial correlation results exceeds a detection threshold.

10. A non-transitory digital storage medium having a computer program stored thereon to perform the method for detecting a sequence of N bits of a reception signal, wherein the method comprises:

receiving a signal comprising the sequence of N bits so as to acquire a reception signal, wherein N is a natural number greater than or equal to eight, N≥8, sampling the reception signal with a sampling rate that corresponds, with an intentional deviation of up to 2/N, to one sample value per bit of the sequence of N bits so as to acquire a sequence of received bits, correlating the sequence of received bits with K different sequences of N−1 reference bits so as to acquire K partial correlation results, wherein K is smaller than or equal to N−1 and greater than or equal to three, N−1≥K≥3, wherein the K different sequences of reference bits are differently punctured versions of the same base sequence of N reference bits, detecting the sequence of N bits when at least one of the K partial correlation results exceeds a detection threshold, when said computer program is run by a computer.

* * * * *

UNITED STATES PATENT AND TRADEMARK OFFICE
CERTIFICATE OF CORRECTION

| | |
|---|---|
| PATENT NO. | : 11,881,975 B2 |
| APPLICATION NO. | : 17/705976 |
| DATED | : January 23, 2024 |
| INVENTOR(S) | : Frank Oehler et al. |

It is certified that error appears in the above-identified patent and that said Letters Patent is hereby corrected as shown below:

In the Claims

In Claim 2, Column 13, Line 16, please delete "$N/3, N/3 < F < 1$" and insert therefore --$N/3, N/3 \geq F \geq 1$--

Signed and Sealed this
Seventh Day of May, 2024

Katherine Kelly Vidal
*Director of the United States Patent and Trademark Office*